(12) United States Patent
Eriksen et al.

(10) Patent No.: US 8,690,540 B2
(45) Date of Patent: Apr. 8, 2014

(54) LUBRICATION SYSTEM FOR A BEARING

(75) Inventors: Uffe Eriksen, Horsens (DK); Jens Anton Agerskov Veng, Ikast (DK)

(73) Assignee: Siemens Aktiengesellschaft, München (DE)

( * ) Notice: Subject to any disclaimer, the term of this patent is extended or adjusted under 35 U.S.C. 154(b) by 476 days.

(21) Appl. No.: 13/050,411

(22) Filed: Mar. 17, 2011

(65) Prior Publication Data

US 2011/0243741 A1   Oct. 6, 2011

(30) Foreign Application Priority Data

Apr. 6, 2010  (EP) .................................. 10159110

(51) Int. Cl.
   *F04D 29/06*   (2006.01)
(52) U.S. Cl.
   USPC ........................................................ 416/174
(58) Field of Classification Search
   USPC ........... 415/111, 113, 229; 416/174; 384/462, 384/464, 472, 473, 474, 475
   See application file for complete search history.

(56) References Cited

U.S. PATENT DOCUMENTS

| | | | |
|---|---|---|---|
| 1,884,925 A | 7/1931 | Vanderbeek | |
| 2,878,894 A | 11/1955 | Andrews | |
| 4,468,066 A * | 8/1984 | Alcorta et al. | 384/462 |
| 4,798,482 A * | 1/1989 | Kruk | 384/571 |
| 2010/0038173 A1* | 2/2010 | Munson | 184/6.11 |
| 2011/0222804 A1* | 9/2011 | Okano et al. | 384/471 |

FOREIGN PATENT DOCUMENTS

| | | |
|---|---|---|
| AU | 2008 331 343 A1 | 2/2010 |
| DE | 92 17 575 U1 | 2/1993 |
| EP | 2 136 093 A1 | 12/2009 |
| GB | 853553 | 11/1960 |
| GB | 1 408 159 | 10/1975 |
| JP | 61 109914 A | 5/1986 |
| WO | WO 2009079975 A1 * | 7/2009 |

* cited by examiner

*Primary Examiner* — Nathaniel Wiehe
*Assistant Examiner* — Eldon Brockman (57) ABSTRACT

A lubrication system is provided for a bearing with a stationary inner ring and a rotating outer ring. The lubrication system includes a distribution ring attached to the outer ring for distributing a lubricant in the bearing. The distribution ring includes transport openings directed towards the bearing for transportation of the lubricant from a lower position of the outer ring to an upper position of the outer ring.

16 Claims, 6 Drawing Sheets

LUBRICATION SYSTEM FOR A BEARING

CROSS REFERENCE TO RELATED APPLICATIONS

This application claims priority of European Patent Office application No. 10159110.5 EP filed Apr. 6, 2010, which is incorporated by reference herein in its entirety.

FIELD OF INVENTION

The invention relates to a lubrication system for a bearing and to a bearing having a lubrication system. In particular, the present invention is directed to a lubrication system for a bearing with a rotating outer ring and a stationary inner ring.

BACKGROUND OF INVENTION

Usually lubrication of a bearing is done with a lubricant like oil which is pumped by an electrical or mechanical pump through the bearing. Normally the oil is collected at the lowest part of the bearing and pumped to the highest part. From the highest part the oil gets distributed by the movement of the bearing and flows down to the lowest part due to gravity.

For a bearing with a rotating outer ring and a stationary inner ring the bearing is not very good accessible in the lowest part because of the outer rotating parts.

SUMMARY OF INVENTION

Accordingly, a need exists for an improved lubrication system for a bearing that addresses these and other shortcomings of the current art.

This need is satisfied by the features of the independent claims. The dependent claims offer further details and advantages of the invention.

In one aspect the invention is directed to a lubrication system for a bearing having a stationary inner ring and a rotating outer ring. The lubrication system has a distribution ring attached to the outer ring for distributing a lubricant in the bearing. The distribution ring has transport openings directed towards the bearing for transportation of the lubricant from a lower position of the outer ring to an upper position of the outer ring. The transport openings fill up with a lubricant like oil in a lower position of the outer ring when the bearing is turning. Due to rotation of the bearing the lubricant-filled transport openings move upwardly following the rotation of the bearing. During rotation the transport openings are turned around so that the lubricant flows out of the transport openings due to gravity. Hence, the lubricant is distributed along the bearing while being transported to an upper position of the outer ring. The lubrication system achieves good lubrication of the bearing with simple means and without the need of pumps or connections from the pump to the bearing. Instead, the rotation of the bearing and gravity are used.

The lubrication system for a bearing may have a seal sealing the distribution ring against a stationary part. Thereby, a lubrication area is defined which surrounds a bearing gap between the inner ring and the outer ring and in which the lubricant is distributed. The seal at the distribution ring allows for a simple configuration of a closed receptacle for the lubricant. The distribution ring itself can be used instead of an additional housing. Moreover, the distribution ring may comprise a sealing against the outer ring, e.g. an o-ring sealing.

The lubrication system for a bearing may have two distribution rings attached at two face sides of the outer ring. This is an elegant design allowing a structure with the same diameter as the bearing without a lubrication system.

The transport openings may be formed in an inner face side surface of the distribution ring and/or in an inner circumferential surface of the distribution ring. The transport openings can be formed at either inner side of the distribution ring. The openings need to be orientated towards the bearing so that the lubricant flowing out of the transport opening reaches the bearing. The opening may be open to both surfaces allowing for an easy manufacturing. In this case the face side part of the opening may be closed by a part of the face side of the distribution ring leaving only the circumferential side part of the opening open.

The lubrication system for a bearing may have a first type of transport opening for transporting the lubricant for a first sense of rotation and a second type of transport opening for transporting the lubricant for a second sense of rotation. For bearings turning in both directions good lubrication is ensured.

The transport opening may have a hole where the centre line of the hole has an angle off the radial direction, e.g. in the range of 10 to 35 degree, in particular 15 to 25 degree and preferably approximately 20 degree and an adjacent pocket in communication with the hole. This design allows to easily scoop the lubricant at a lower position of the outer ring through the hole into the pocket. While turning upwards the transport opening gets tilted more and more thereby slowly releasing the lubricant from the pocket through the hole.

The transport opening may have a hole in radial direction with a wider part which lies radial outwardly. The transport opening has roughly the shape of a bottle. This shape of the transport opening also allows a gradual release of the lubricant ensuring a complete lubrication of the bearing.

The lubricant may be oil which is an inexpensive lubricant of good quality.

Multiple transport openings may be provided which are evenly distributed along the perimeter of the distribution ring. Having several transport openings like for example ten to hundred allows a very even lubrication of the bearing. For a given need of lubricant multiple transport openings allow for smaller transport openings which weaken the structure of the distribution ring only to a small extent.

Note that the distribution ring may also be divided into several rings, e.g. two rings where the first ring comprises the transport openings and the second ring comprises the seal which seals against a stationary part. Each ring may be connected to each other and/or connected to the outer ring. A further seal between each ring and/or the outer ring may be added.

In another aspect the invention is directed to a bearing with a stationary inner ring and a rotating outer ring comprising a lubrication system as described above. For a bearing with a rotating outer ring the lubrication system achieves a very good lubrication of the bearing at small dimensions and with little complexity.

In a further aspect the invention is directed to a wind turbine with a tower, a main shaft connected therewith, a blade hub rotatively connected via a main bearing to the main shaft and blades connected to the blade hub. The wind turbine has a lubrication system as described above. For a wind turbine having a bearing with a rotating outer ring the lubrication system achieves a very good lubrication of the bearing at small dimensions and with little complexity.

BRIEF DESCRIPTION OF THE DRAWINGS

The accompanying drawings are included to provide a further understanding of embodiments. Other embodiments and many of the intended advantages will be readily appreciated as they become better understood by reference to the following detailed description. The elements of the drawings do not necessarily scale to each other. Like reference numbers designate corresponding similar parts.

DETAILED DESCRIPTION OF INVENTION

In the following detailed description, reference is made to the accompanying drawings which form a part hereof and in which are shown by way of illustration specific embodiments in which the invention may be practiced. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
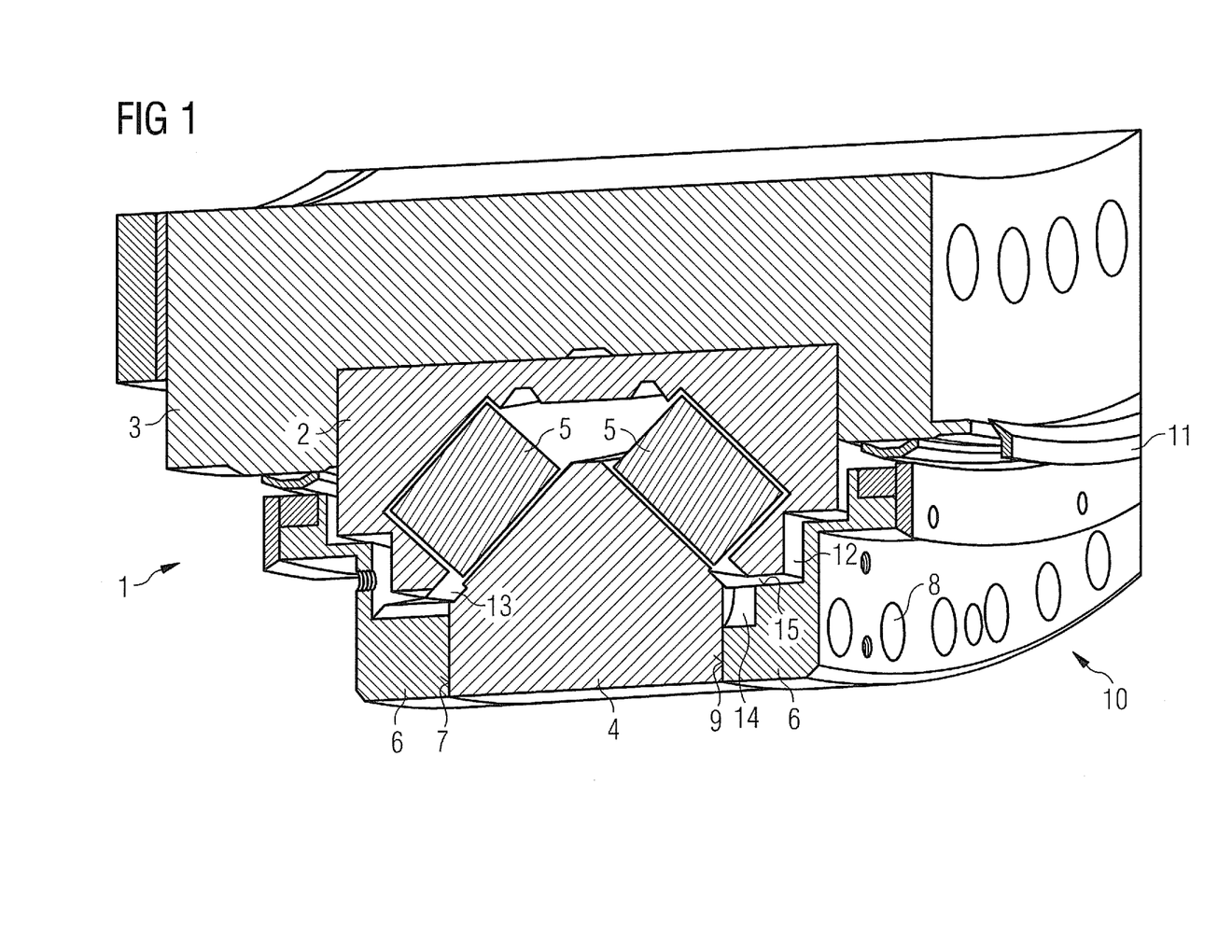
FIG. 1 illustrates a schematic view of a bearing with a lubrication system in a lower position according to the invention.

FIG. 1 shows a bearing 1 with a stationary inner ring 2. The inner ring 2 is fixed to a stationary part 3 of a structure e.g. a wind turbine. The inner ring 2 can be bolted together with the stationary part 3 or pressed to it. A combination of both is possible as well.

Figure 6:
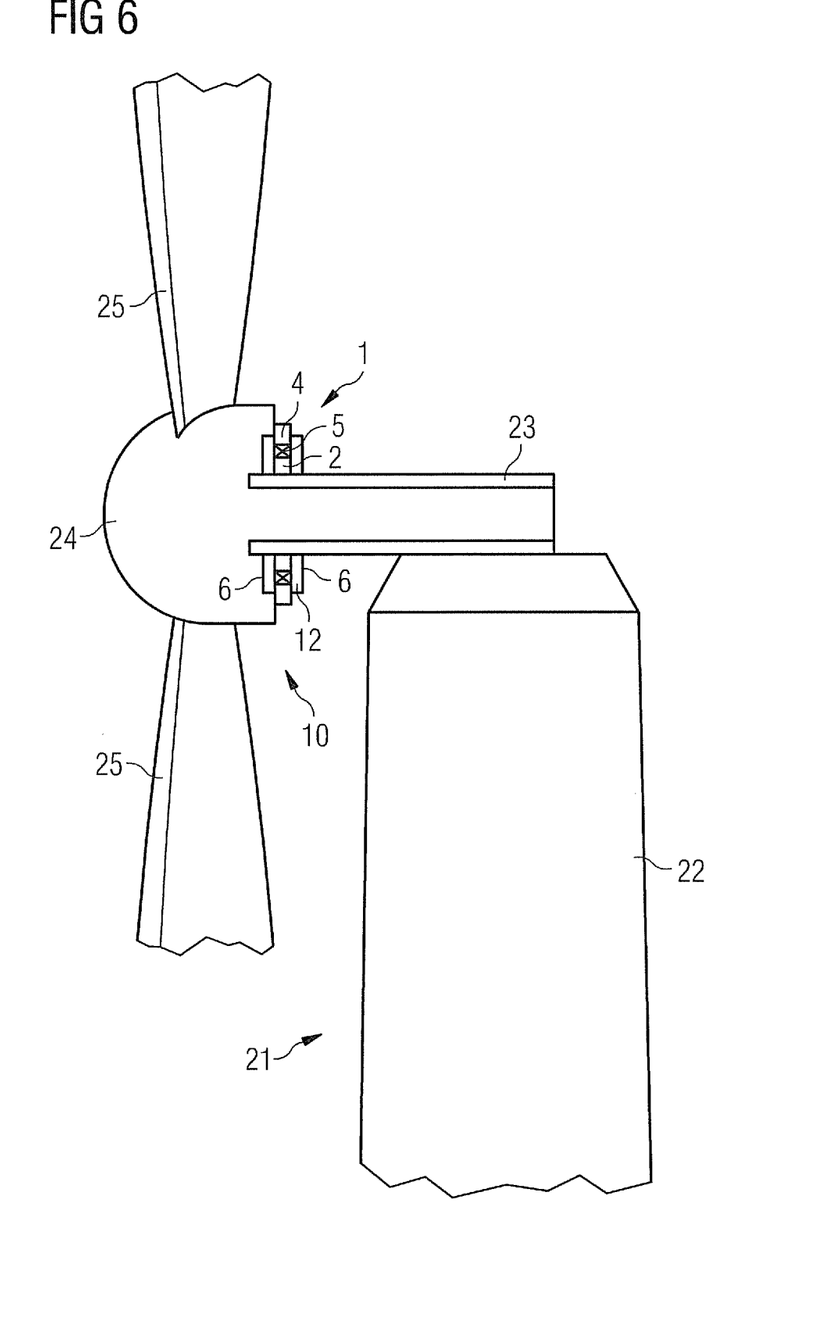
FIG. 6 illustrates a schematic view of a wind turbine with a bearing and a lubrication system according to the invention.

An outer ring 4 of the bearing 1 is rotatively connected via rollers 5 with the inner ring 2. The shape, size and material of the rollers or balls 5 depends on the usage of the bearing and can be designed accordingly. The bearing 1 can be utilized for example in a wind turbine as shown in FIG. 6. In this case, the stationary part 3 may be a main shaft or attached to the main shaft and a blade hub may be attached to the outer ring 4.

A distribution ring 6 is part of a lubrication system 10 and is attached to a face side 7 of the outer ring 4. The distribution ring 6 is attached with bolts or screws through bolt holes 8 which are arranged along the perimeter of the distribution ring 6. A face side 9 of the distribution ring 6 lies against the face side 7 of the outer ring 4. At the outer circumference of the bearing 1 the outer ring 4 and the distribution ring 6 form a common circumferential surface. The distribution ring 6 may comprise a sealing against the outer ring 4, e.g. an o-ring sealing. The distribution ring 6 may also be integrally formed with the outer ring 4.

At a radial inner end of the distribution ring 6 a seal 11 is attached. The seal 11 seals the rotating parts of the bearing 1 i.e. the outer ring 4 and the distribution ring 6 against the stationary parts i.e. the inner ring 2 and the stationary part 3. The other end of the seal 11 contacts the stationary part 3. Instead, the other end of the seal 11 may contact the inner ring 2. This depends on the characteristics of the bearing and the installation. The size, material and design of the seal 11 can be chosen from known solutions which are suitable to seal a bearing.

A second distribution ring 6 which is preferably identical to the first distribution ring 6 is arranged at an opposite face side of the outer ring 4. Both distribution rings 6 together with the outer ring 4 and the inner ring 2 and/or the stationary part 3 form a lubrication area 12. The lubrication area 12 is filled with a lubricant which is not shown for the sake of clarity. The lubricant lubricates the bearing 1. The lubrication area 12 envelopes at least a bearing gap 13 between the inner ring 2 and the outer ring 4. The lubrication area 12 can further envelop parts or the complete inner and/or outer ring 2 and 4, respectively. The second distribution ring 6 may also be integrally formed with the outer ring 4.

Instead of two separate distribution rings 6 one distribution ring can be utilized. This distribution ring would have a middle part bridging a circumferential outer surface of the outer ring 4.

The distribution ring 6 has multiple transport openings 14 for transportation of a lubricant within the bearing 1 or more specifically, inside the lubrication area 12. The lubricant lubricates the bearing 1 to guarantee a long-lasting operation of the bearing 1.

The transport openings 14 project into the distribution ring 6 from the face side 9 and an inner circumferential surface 15 of the distribution ring 6. The transport openings 14 may be cut into the distribution ring 6. Details and examples of the transport openings 14 are discussed later in conjunction with FIGS. 3 and 4.

The transport openings 14 may be arranged at the outer ring 4 instead. In this case, care has to be taken that a closed lubrication area is achieved. This can be done by adapted distribution rings which then have the function of sealing the lubrication area. A housing surrounding at least the bearing gap 13 can be used as well.

FIG. 1 shows the bearing 1 or the outer ring 4 in a lower position. The distribution rings 6 together with the outer ring 4 are in this lower position as well. The term "lower position" is a snap-shot view of the bearing 1 with focus on a certain point of the outer ring 4 or a single transport opening 14.

At the lower position the transport opening 14 fills with the lubricant due to movement of the outer ring 4/distribution ring 6 and/or due to gravity. With ongoing rotation of the bearing 1 the transport opening 14 moves further upward while getting tilted more and more until an upper position.

Figure 2:
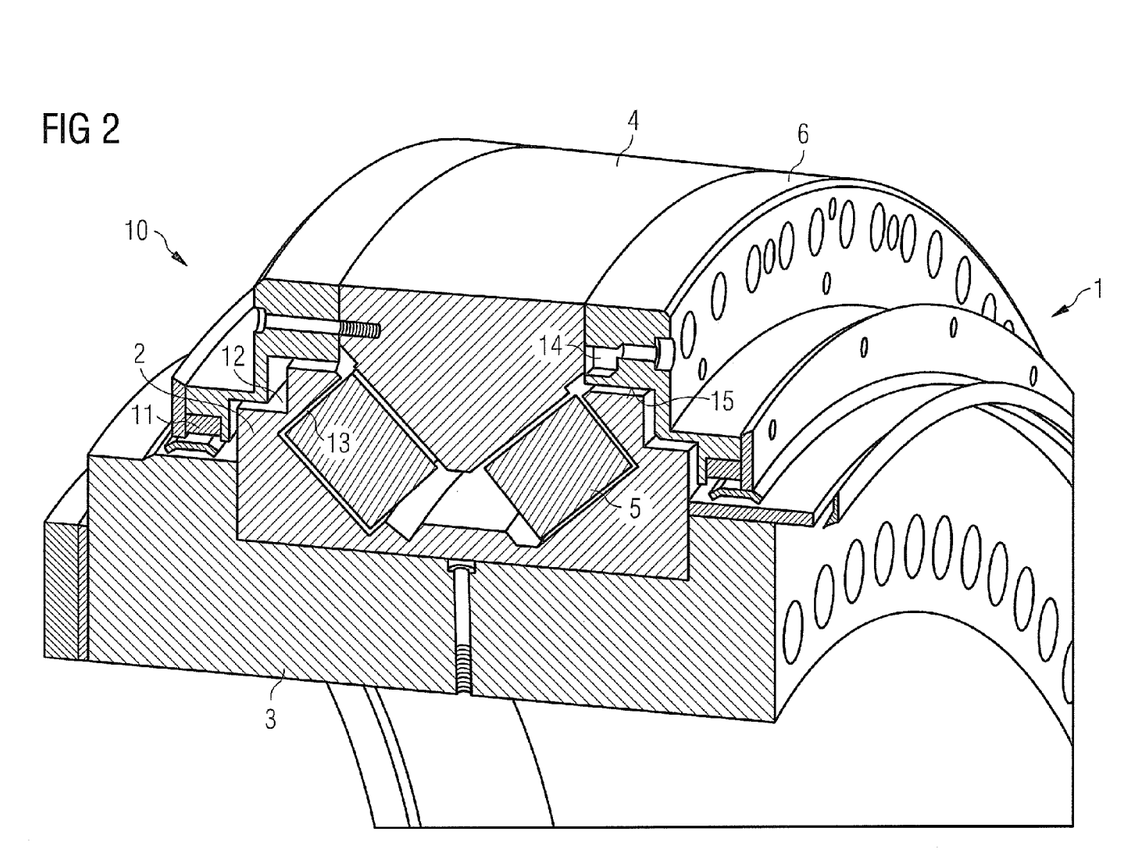
FIG. 2 illustrates a schematic view of a bearing with a lubrication system in an upper position according to the invention.

FIG. 2 depicts the upper position of the bearing 1, the outer ring 4 and the distribution ring 6. In the upper position the transport opening 14 is completely turned around i.e. rotated by approximately 180 degrees. In this position the transport opening 14 is empty or almost empty.

The transport opening 14 has an opening inside the inner circumferential surface 15 of the distribution ring 6. As the normal of the inner circumferential surface 15 gets tilted more and more during rotation of the bearing 1 the transport opening 14 empties more and more the higher it travels up to the upper position.

Figure 3:
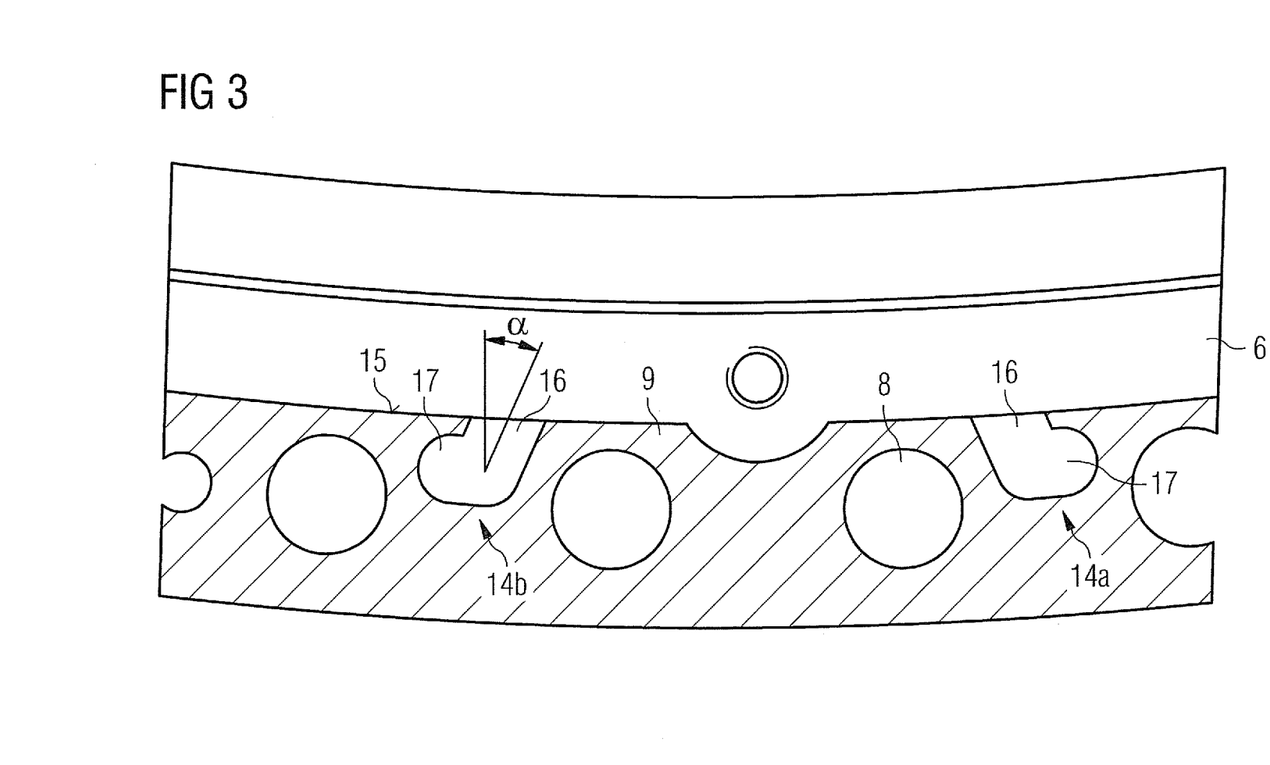
FIG. 3 illustrates a schematic view of a section of a distribution ring with transport openings according to the invention.

FIG. 3 shows a first design of the transport opening 14. Two different types of transport openings 14 are used: A first type 14*a* and a second type 14*b*. The first type 14*a* of the transport opening 14 transports a lubricant for a first sense of rotation. Here, the first sense of rotation is clockwise. The second type 14*b* of the transport opening 14 transports a lubricant for a second sense of rotation. Here, the second sense of rotation is counter-clockwise. The two types 14a and 14b of the transport opening 14 are symmetrical.

Each type 14a and 14b has a hole 16 inside the inner circumferential surface 15 and an adjacent pocket 17. The pocket 17 is in communication with the hole 16 so that lubricant entering the transport opening 14 through the hole 16 flows further into the pocket 17 where it is deposited for release during rotation of the bearing 1.

The hole 16 has an angle α of approximately 20 degrees off the radial direction. The size of the angle α may depend on the speed of rotation, the used lubricant and/or the needed rate of lubricant release. For type 14a of the transport opening 14 the angle α is approximately 20 degrees off the radial direction in counter-clockwise direction. For type 14b the angle α is approximately 20 degrees off the radial direction in clockwise direction.

The size of the pocket 17 may depend on the used lubricant and/or the needed amount of lubricant.

The transport openings 14 can be easily manufactured by drilling a first hole into the inner circumferential surface 15 which forms the hole 16 and by drilling a second hole into the inner face side surface 9 which forms the pocket 17. The transport openings 14 are arranged between the bolt holes 8. One can also use the bolt hole 8 as the pocket.

This shape of the transport opening 14 guarantees that the lubricant can travel far enough during rotation of the bearing 1 and can be distributed uniformly to the bearing 1 along the movement.

Figure 4:
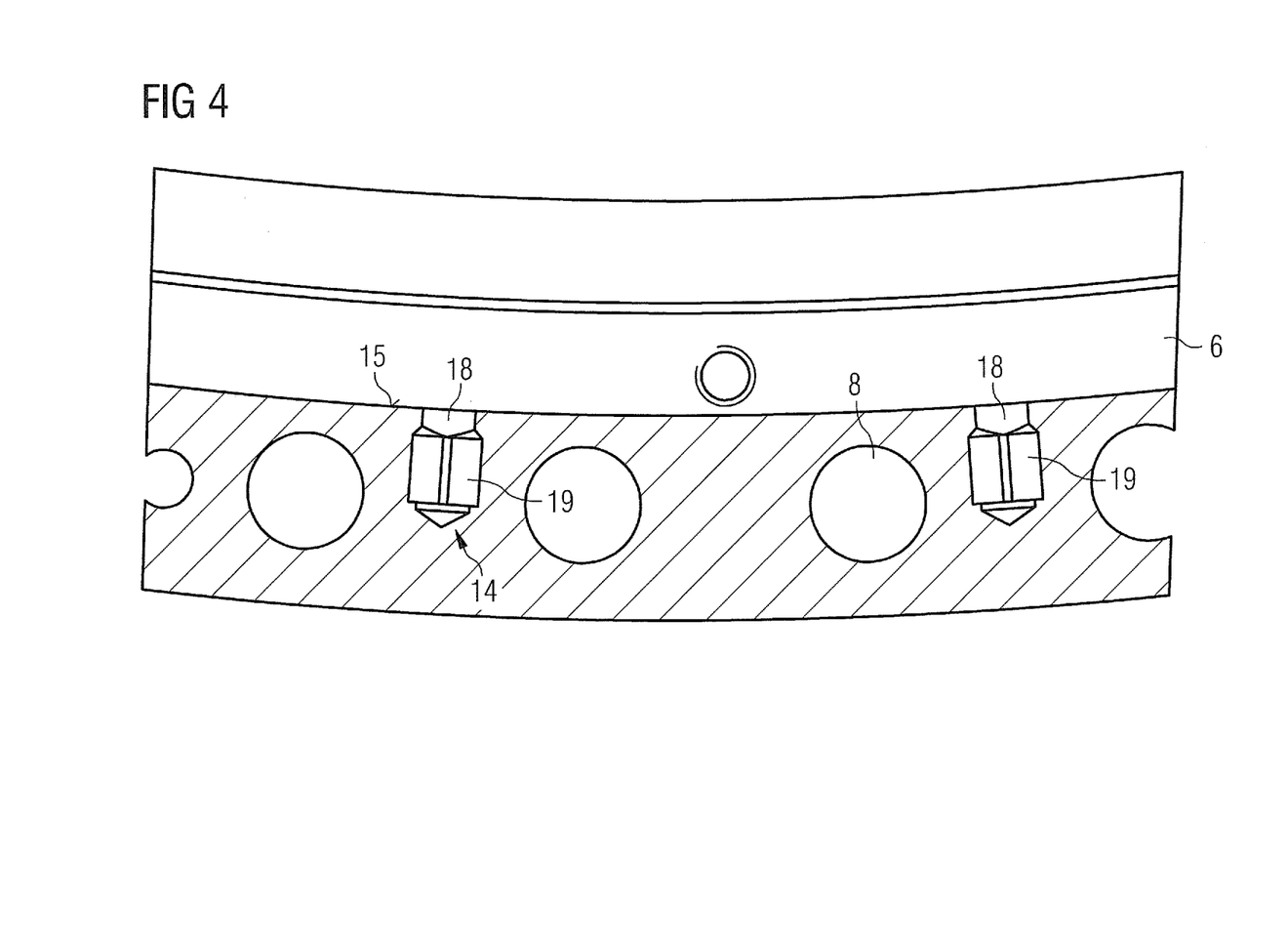
FIG. 4 illustrates a schematic view of a section of a distribution ring with further transport openings according to the invention.

FIG. 4 shows another example of a design for a transport opening 14. The transport openings are arranged between the bolt holes 8 and have a hole 18 in the inner circumferential surface 15 in radial direction. Further outward in radial direction the hole 18 has a wider part 19. The wider part 19 functions as a reservoir for the lubricant.

This design is symmetrical to the radial direction so that the transport opening 14 with hole 18 and wider part 19 can transport and release lubricant in both directions, clockwise and counter-clockwise.

The size i.e. depth and diameter of the hole 18 and the wider part 19 may depend on the speed of rotation, the used lubricant, the needed rate of lubricant release and/or the needed amount of lubricant.

The transport openings 14 can be easily manufactured by drilling a first hole into the inner circumferential surface 15 which forms the hole 18 and by widening the hole in its cross-sectional shape which forms the wider part 19. The overall shape of the transport opening 14 can be described as bottle-shaped.

This shape of the transport opening 14 guarantees that the lubricant can travel far enough during rotation of the bearing 1 and can be distributed uniformly to the bearing 1 along the movement.

Figure 5:
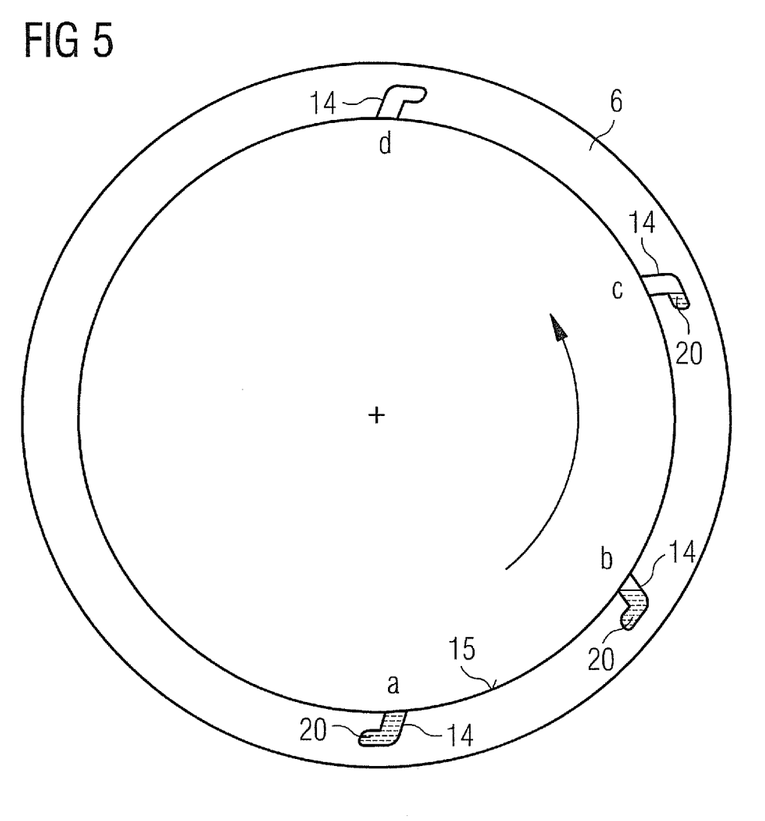
FIG. 5 illustrates a schematic view of a distribution ring with transport openings according to the invention.

FIG. 5 shows the distribution ring 6 with only few details to explain the conveyance of the lubricant 20. Only few of the transport openings 14 are depicted. Also, only transport openings 14 for counter-clockwise rotation are shown. This limitation is only for the sake of clarity. The distribution ring 6 has more transport openings and transport openings for clockwise rotation as well.

In a lower position a the transport opening 14 gets filled with lubricant 20 due to gravity and to the movement of the distribution ring 6 as indicated by the arrow. Depending on the speed of rotation, the lubricant 20 and the shape of the transport opening 14 the transport opening 14 may not be exactly filled at the lower position a but a bit in front of or behind the lower position a.

The total amount of lubricant 20 inside the bearing 1 or the lubrication area 12 is dimensioned in a way so that at least at the lower position a the inner circumferential surface 15 of the distribution ring 6 is completely covered.

With the rotation of the bearing 1 the transport opening 14 travels further up thereby rotating itself. In a first intermediate position b some lubricant 20 was already released from the transport opening 14. The lubricant 20 is gradually released due to rotation, gravity and the shape of the transport opening 14. The release of a constant stream of lubricant 20 may be optimal.

In a second intermediate position c almost all of the lubricant 20 has been released. Only in a rear-part of the transport opening 14 some lubricant is left. This remaining lubricant 20 is gradually released while the transport opening 14 travels to the upper position d. At the upper position d the transport opening 14 is empty or almost empty.

The lower and upper position a and d, respectively do not necessarily need to be orientated vertically as shown in FIG. 5. Depending on the lubricant, the speed of rotation and/or the shape, size and/or number of transport openings 14 the positions can deviate from being perpendicular. Further, it is not necessary that the lower position a and the upper position d are spaced by an angle of 180 degrees from each other.

After reaching the upper position the transport opening 14 travels down towards position a where it is getting filled with lubricant 20 again.

FIG. 6 shows a wind turbine 21 with a tower 22 and a main shaft 23 fixed on top of the tower 22. The bearing 1 connects the main shaft 23 and a blade hub 24 rotatively. Two or more blades 25 are fixed to the blade hub 24.

The stationary inner ring 2 is attached to the main shaft 23 while the rotating outer ring 4 is attached to the blade hub 24. Both rings 2 and 4 are movably connected via rollers 5. Two distribution rings 6 are mounted to the outer ring 4 and sealed against the main shaft 23. The lubrication area 12 is defined by the distribution rings 6, the outer ring 4 and the main shaft 23.

The lubrication system 10 has transport openings and functions as described with respect to FIGS. 1 to 5 above.

The invention claimed is:

1. A lubrication system for a bearing, the bearing having a stationary inner ring and a rotating outer ring, the lubrication system comprising:
    a distribution ring attached to the outer ring for distributing a lubricant in the bearing, the distribution ring comprising transport openings directed towards the bearing for transportation of the lubricant from a lower position of the outer ring to an upper position of the outer ring,
    a first type of transport opening for transporting the lubricant for a first sense of rotation and a second type of transport opening for transporting the lubricant for a second sense of rotation.

2. The lubrication system according to claim 1, comprising two distribution rings attached at two face sides of the outer ring.

3. The lubrication system according to claim 1, wherein the transport openings are formed in an inner face side surface of the distribution ring.

4. The lubrication system according to claim 1, wherein the transport openings are formed in an inner circumferential surface of the distribution ring.

5. The lubrication system according to claim 1, wherein the lubricant is oil.

6. The lubrication system according to claim 1, wherein multiple transport openings are evenly distributed along a perimeter of the distribution ring.

7. The lubrication system according to claim 1, wherein the distribution ring is divided into at least two rings.

8. A bearing, comprising:
a stationary inner ring;
a rotating outer ring; and
a lubrication system for the bearing as claimed in claim 1.

9. A wind turbine, comprising:
a tower;
a main shaft connected to the tower;
a blade hub having blades connected thereto; and
a main bearing rotatively connecting the blade hub to the main shaft, the main bearing comprising:
a stationary inner ring;
a rotating outer ring; and
a lubrication system for the bearing as claimed in claim 1.

10. A lubrication system for a bearing, the bearing having a stationary inner ring and a rotating outer ring, the lubrication system comprising:
a distribution ring attached to the outer ring for distributing a lubricant in the bearing, the distribution ring comprising transport openings directed towards the bearing for transportation of the lubricant from a lower position of the outer ring to an upper position of the outer ring,
wherein the transport opening comprises a hole wherein a center line of the hole has an angle off a radial direction, and an adjacent pocket in communication with the hole.

11. The lubrication system according to claim 10, wherein the angle lies in the range of 10 to 35 degree.

12. A bearing, comprising:
a stationary inner ring;
a rotating outer ring; and
a lubrication system for the bearing as claimed in claim 10.

13. A wind turbine, comprising:
a tower;
a main shaft connected to the tower;
a blade hub having blades connected thereto; and
a main bearing rotatively connecting the blade hub to the main shaft, the main bearing comprising:
a stationary inner ring;
a rotating outer ring; and
a lubrication system for the bearing as claimed in claim 10.

14. A lubrication system for a bearing, the bearing having a stationary inner ring and a rotating outer ring, the lubrication system comprising:
a distribution ring attached to the outer ring for distributing a lubricant in the bearing, the distribution rim comprising transport openings directed towards the bearing for transportation of the lubricant from a lower position of the outer ring to an upper position of the outer ring,
wherein the transport opening comprises a hole in a radial direction with a wider part which lies radial outwardly.

15. A bearing, comprising:
a stationary inner ring;
a rotating outer ring; and
a lubrication system for the bearing as claimed in claim 14.

16. A wind turbine, comprising:
a tower;
a main shaft connected to the tower;
a blade hub having blades connected thereto; and
a main bearing rotatively connecting the blade hub to the main shaft, the main bearing comprising:
a stationary inner ring;
a rotating outer ring; and
a lubrication system for the bearing as claimed in claim 14.

* * * * *